Figure 1:
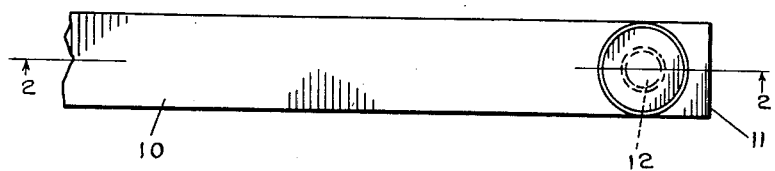

April 14, 1953  L. D. SINGLETON  2,634,967
TAPE CONNECTION
Filed Nov. 2, 1945

INVENTOR.
LESTER D. SINGLETON.
BY
*Henry Sherman*
ATTORNEY

Patented Apr. 14, 1953

2,634,967

UNITED STATES PATENT OFFICE 2,634,967

TAPE CONNECTION

Lester D. Singleton, Rutland, Vt., assignor to The Howe Scale Company, a corporation of Vermont Application November 2, 1945, Serial No. 626,236

4 Claims. (Cl. 265—61)

This invention relates to flexible metal tape connections and relates more particularly to flexible steel tape connections for weighing scales.

Relatively thin, flexible metal tapes or ribbons, such as steel tapes or ribbons, for example, are employed in weighing scales to connect the pendulum cams to other scale parts such as the steelyard rod, for example. The accuracy of the scale depends in large measure on proper adjustment and operation of such flexible steel tapes. When the tape kinks or departs from straight alignment, an inaccurate weight indication will result.

Another factor which contributed to lower considerably the efficiency of the steel tapes was the ease, relatively speaking, with which the thin steel tapes fractured at the point of contact with the pendulum cam surface or at the point of contact with the steelyard rod or other scale part.

It is an object of this invention to provide an improved connecting or anchoring arrangement for thin, flexible steel tapes or ribbons which will be free from the above-mentioned and other disadvantages and which will be especially efficient in operation.

Another object of this invention is the provision of a novel anchoring arrangement for flexible steel tapes permitting the tapes to be aligned readily and to return to proper alignment after any movement thereof, and substantially eliminating buckling, kinking and turning of the tapes.

A further object of this invention is the provision of a novel clip for attachment to the ends of the steel tapes.

Still another object of this invention is to provide in steel tapes an opening of such dimension as to make the steel tape much stronger in use, preventing the easy breakage thereof at its points of contact with scale elements.

Other objects and advantages of this invention, together with certain details of construction and combination of parts, will be apparent from the following detailed description and the appended claims.

Figure 2:
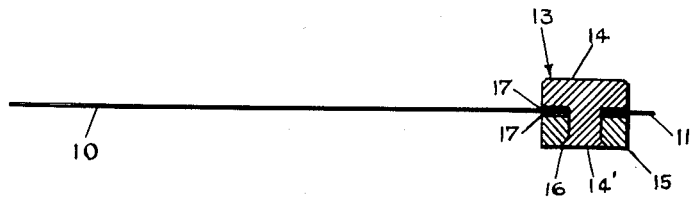
Figure 3:
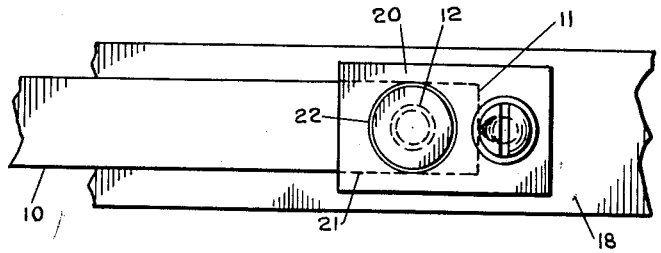
Figure 4:
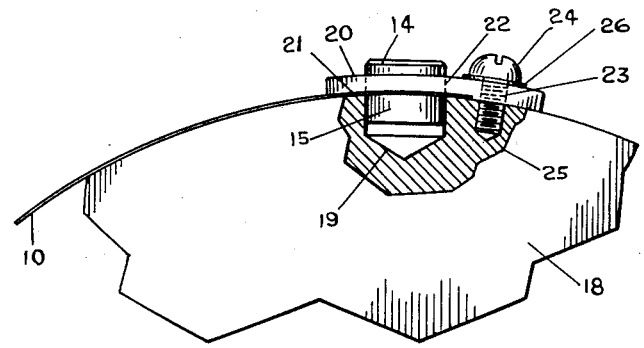

In the drawings, wherein the preferred embodiment of this invention is shown,

Figure 1 is a top plan view of one end of the tape with a clip attached thereto, Figure 2 is a cross-sectional view of the tape shown in Figure 1, taken on line 2—2 in Figure 1, Figure 3 is a top plan view showing the tape anchored on the surface of a pendulum cam segment, and Figure 4 is a side elevational view of a part of the cam segment and the tape in operative position thereon, with a part of the cam segment broken away to show in greater detail how the tape is anchored thereon.

Like reference characters indicate like parts throughout the several views of the drawing.

In the drawings, the reference numeral 10 indicates a tape or ribbon which is preferably of thin flexible steel, but any other suitable metal may be employed. The tape 10 is shown with a squared end 11, but the ends may be rounded off, if desired. Spaced from the end 11, the tape is provided with an opening 12, preferably circular in configuration. It is of importance that the opening be of such dimension that the diameter or width thereof in the direction of the width of the tape be substantially one-third of the width of the tape. In other words, the opening in the tape should be provided on each side thereof with a width of steel tape equal to substantially the diameter or width of the opening. The opening should be spaced from the end of the tape a distance of at least the diameter of the opening. It has been found that a steel tape connection having such an opening makes for a stronger connection and is less likely to break in use.

Attached to the end of the tape 10 is a clip generally indicated by reference numeral 13. The clip comprises a button, disk or stud member 14 having a shank 14' adapted to pass through opening 12 of the tape, and a collar or annulus 15 passing over the shank 14'. The shank is peaned over at 16 to hold the collar in position and the tape between the member 14 and the collar, thus forming a clip. Preferably, shims or washers 17 of soft material, such as copper or other soft metal, plastic or cloth, are placed between the button and annulus members 14 and 15, in the assembly of the clip.

To mount the tape in the scale or, as shown, on cam segment 18, the cam segment is provided with a recess on the surface thereof of a diameter but little larger than the diameter of collar 15. The collar of clip 13 holding the tape is inserted in said recess 19. An anchoring plate 20 is employed to hold the clip in recess 19. Plate 20 is undercut at 21 for a portion of its length to provide a seat for tape 10. Plate 20 is also provided with an opening 22 adapted to fit loosely over member 14 of the clip, and a smaller opening 23 through which a retaining screw 24 passes to be received in a threaded opening 25 in the surface of the cam segment 18. A washer 26 may be provided between the head of screw 24 and the upper surface of anchor plate 20.

The foregoing arrangement of flexible steel tape, clip and anchoring means permits of the tape to move freely in a radial direction over the surface of the cam segment without buckling or kinking with an immediate return to its center or proper position. Moreover, the anchoring arrangement of this invention is such that the strain on the tape is borne in part by the anchor plate, thereby giving longer life to the tape and permitting a greater load to be placed thereon without danger of fractioning the tape. The anchoring arrangement makes for a more simple and expeditious mounting of the tape on the cam segment or other scale part.

While the flexible steel tape and mounting therefor have been described in connection with its use in weighing scale, it will readily be understood that it may be employed wherever flexible steel tapes are used as connecting means.

Having thus described my invention, what I claim as new and desire to secure by Letters Patent is:

1. A self-aligning tape connection for weighing scales, in combination with a cam segment having a recess in the surface thereof, a flexible steel tape having a circular opening therein, said opening being of a diameter substantially one-third of the width of said steel tape, a clip fixed in said tape opening and having portions extending from the surfaces of said tape, one of said portions being pivotally mounted in said recess, means, including a plate having an opening therein, adapted to fit over the other of said portions, and means for securing the plate to the segment for holding said tape and said clip in position on said cam segment.

2. A connection for a self-aligning steel tape to serve as a connection between said steel tape and a cam segment of a weighing machine, said segment having a circular recess therein, and said tape having a circular central opening, said connection including a stud having an enlarged circular disk-like head with a post extending downwardly through said opening, and an annulus received upon the lower projecting portion of said post permanently mounted on the bottom of said post, said annulus being received in the recess in said segment and said tape having free radial movement from the surface of the cam segment.

3. In weighing scales, a flexible steel tape connection between a steel tape and a pendulum cam, said tape having a central opening adjacent the end of the tape, said opening receiving an anchor clip formed of an upwardly projecting button member and a downwardly projecting shank extending through said opening, a collar permanently mounted on the lower end of said shank below said opening, said cam having a recess to receive said collar and an anchor plate mounted on the top of said cam and extending over said recess and engaging said button member.

4. The connection of claim 3, said anchor plate being mounted on said cam beyond the end of said tape and being curved to conform to said cam and being recessed where it projects over the end of said tape so as to permit lateral movement of said tape.

LESTER D. SINGLETON.

References Cited in the file of this patent

UNITED STATES PATENTS

| Number | Name | Date |
| --- | --- | --- |
| 172,936 | Riethmuller | Feb. 1, 1876 |
| 791,621 | Hocks | June 6, 1905 |
| 826,584 | Lehman | July 24, 1906 |
| 939,902 | Garrison | Nov. 9, 1909 |
| 1,186,901 | Higgins | June 13, 1916 |
| 1,272,674 | Keller | July 16, 1918 |
| 1,543,399 | Smith | June 23, 1925 |
| 1,701,921 | Hamblin | Feb. 12, 1929 |
| 1,702,855 | Swanson | Feb. 19, 1929 |
| 2,035,031 | Von Koczian | Mar. 24, 1936 |
| 2,243,690 | Watling | May 27, 1941 |